US012717751B2

(12) United States Patent
Huang et al.

(10) Patent No.: US 12,717,751 B2
(45) Date of Patent: Aug. 25, 2026

(54) TENSOR PROCESSOR WITH RE-ROUTABLE PROCESSING ELEMENTS WITH MULTIPLE MULTIPLEXERS AND A METHOD FOR PROCESSING TENSORS WITH THE TENSOR PROCESSOR THEREOF

(71) Applicant: Centre for Intelligent Multidimensional Data Analysis Limited, Hong Kong (CN)

(72) Inventors: Wei-pei Huang, Hong Kong (CN); Chak Chung Ray Cheung, Hong Kong (CN); Hong Yan, Hong Kong (CN)

(73) Assignee: Centre for Intelligent Multidimensional Data Analysis Limited, Hong Kong (CN)

( * ) Notice: Subject to any disclaimer, the term of this patent is extended or adjusted under 35 U.S.C. 154(b) by 0 days.

(21) Appl. No.: 17/543,986

(22) Filed: Dec. 7, 2021

(65) Prior Publication Data

US 2023/0177000 A1 Jun. 8, 2023

(51) Int. Cl.

*G06F 15/80* (2006.01)
*G06F 9/30* (2018.01)
*G06F 17/16* (2006.01)
*G06N 3/063* (2023.01)

(52) U.S. Cl.

CPC .............. *G06F 15/80* (2013.01); *G06F 17/16* (2013.01)

(58) Field of Classification Search

CPC ............ G06F 15/80; G06F 17/16; G06N 3/00
See application file for complete search history.

(56) References Cited

U.S. PATENT DOCUMENTS 8,782,115 B1 * 7/2014 Dhanoa ............... H04L 25/0246 708/514
11,036,827 B1 * 6/2021 Zejda ...................... G06F 17/16
2020/0134417 A1 * 4/2020 Mohapatra .............. G06F 17/16
2022/0100813 A1 * 3/2022 Lagudu ............... G06F 13/1663
2022/0129743 A1 * 4/2022 Sawada .................... G06N 3/08
2022/0261456 A1 * 8/2022 Gladding ................ G06F 17/16
2022/0318606 A1 * 10/2022 Kim ....................... G06N 3/045
2022/0350861 A1 * 11/2022 O ........................... G06F 17/16
(Continued)

OTHER PUBLICATIONS

Zhang, K et al. Tucker Tensor Decomposition on FPGA. 2019 IEEE/ACM International Conference on Computer-Aided Design (ICCAD), 2019, pp. 1-8 [online], [retrieved on Jul. 25, 2023]. Retrieved from the Internet <URL: https://ieeexplore.ieee.org/abstract/document/8942103> <DOI: 10.1109/ICCAD45719.2019.8942103>.*

(Continued)

*Primary Examiner* — Shawn Doman
(74) *Attorney, Agent, or Firm* — Renner, Kenner, Greive, Bobak, Taylor & Weber

(57) ABSTRACT

A tensor processor comprising a processing element array, the array having a plurality of processing elements arranged to individually perform operations on variables of a tensor, wherein each of processing elements are individually controlled by a processing element controller to perform tensor operations on a tensor. The processing elements controller are controlled by a series of tensor operation modules to perform a specific tensor operation.

13 Claims, 8 Drawing Sheets

(56) References Cited

U.S. PATENT DOCUMENTS

2022/0366005 A1* 11/2022 Nowicki ................ G06F 17/16
2022/0414054 A1* 12/2022 Parra .................... G06F 9/3828

OTHER PUBLICATIONS

Smith, S et al. Accelerating the Tucker Decomposition with Compressed Sparse Tensors. Euro-Par 2017: Parallel Processing, 2017 , [retrieved on Jul. 25, 2023]. Retrieved from the Internet <URL: https://link.springer.com/chapter/10.1007/978-3-319-64203-1_47>.*

Kumar, V.B.Y., et al. "FPGA based High Performance Double-precision Matric Multiplication", 2009 22nd International Conference on VLSI Design, 2009 IEEE, DOI: 10.1109/VLSI.Design.2009. 13, pp. 341-346.

Huang, W., et al., "An Efficient Application Specific Instruction Set Processor (ASIP) for Tensor Computation", 2019 IEEE 30th International Conference on Application—Specific Systems, Architectures and Processors (ASAP), vol. Jul. 2019, p. 37.

Huang, W., et al., "An Efficient Parallel Processor for Dense Tensor Computation", IEEE Transactions on Very Large Scale Integration (VLSI) Systems, vol. Jul. 2021, pp. 1-13.

* cited by examiner

TENSOR PROCESSOR WITH RE-ROUTABLE PROCESSING ELEMENTS WITH MULTIPLE MULTIPLEXERS AND A METHOD FOR PROCESSING TENSORS WITH THE TENSOR PROCESSOR THEREOF

TECHNICAL FIELD

The present invention relates to a tensor processor, and particularly, although not exclusively, to a tensor processor arranged to perform parallel processing of tensors or tensor related calculations.

BACKGROUND

With the development of deep learning and computer vision, the processing of multi-dimensional data is now becoming a common process in many modern applications. The background in performing calculations of multi-dimensional data is known in advance mathematics and linear algebra, but the implementation of computing systems to perform these calculations is a more recent development.

In recent uses of computing technology, tensor calculations, which refer to the calculations, operations and manipulations of multi-dimensional data, are performed by the use of traditional multiplication and addition logic functions. This operates adequately to perform the necessary calculations, but is inefficient if a significant number of calculations are required at any one time due to the large volumes of operations required from the multiple dimensions of data that are required to be manipulated in any one individual operation.

However, with recent advances in deep learning, computer vision or advanced modelling, applications which require a significant amount of tensor calculations are becoming more common in research as well as in everyday user applications. In turn, with portable devices that have only a limited amount of processing power, existing processor architectures are unable to effectively handle the newly expected volumes of tensor calculations.

SUMMARY OF THE INVENTION

In accordance with a first aspect of the present invention, there is provided a tensor processor comprising:

- a processing element array, the array having a plurality of processing elements arranged to individually perform operations on variables of a tensor, wherein each of processing elements are individually controlled by a processing element controller to perform tensor operations on a tensor.

In a further example, the processing elements controller are controlled by a series of tensor operation modules to perform a specific tensor operation.

Preferably, the tensor processor is arranged to perform multiple tensor operations on a unified processing element array. The input data of a processing element may also be configured as shared data source locates in a single data buffer or independent data source locates in distributed input data buffers.

In an embodiment of the first aspect, the components of the tensor are decomposition components of the tensor.

In an embodiment of the first aspect, the processing element controller is arranged to control the plurality of processing elements in multiple parallel arrays to perform tensor operations in parallel.

In an embodiment of the first aspect, the plurality of processing elements is controlled by the processing element controller to perform tensor operations on tensors and tensor components.

In an embodiment of the first aspect, the plurality of processing elements is operated by the processing element controller into multiple parallel arrays, each arranged to perform tensor operations on the tensors.

In an embodiment of the first aspect, when the tensor operations for the tensor is completed, a result is generated.

In an embodiment of the first aspect, the component results are accumulated to determine a result of the tensor operation for the tensor.

Preferably, the processing elements located within a single processing column may be re-routed into other computational structures including adder-tree, multiplier adder tree, and comparator tree. The re-route is done by a series of multiplexers and control signals.

In an embodiment of the first aspect, the processing element controller receives control signal from specific tensor operations control modules of the processor, while the tensor operations control modules receive control signal from the central control unit.

In an embodiment of the first aspect, the plurality of tensor operation modules include:

- a Matricized Tensor times Khatri-Rao module arranged to calculate a Matricized Tensor times Khatri-Rao product;
- a Hadamard module arranged to calculate a Hadamard product;
- a tensor multiplication module arranged to perform Tensor times matrix multiplication operation;
- an inversion module arranged to perform Matrix inversion operations;
- a Normal (norm) module arranged to perform calculation and normalize calculations; and,
- a Tensor times matrices chain (TTMc) module arranged to perform TTMc operations.

In an embodiment of the first aspect, the tensor operations for each component of the tensor is completed, a operation result is generated.

In an embodiment of the first aspect, each of the plurality of tensor operation modules performs a specific tensor operation, and instructs the processing element controller to control the processing elements to perform the tensor operations on the components as well as re-route the processing elements if it is needed.

As the plurality of tensor operations may be the most time consuming parts in the computation of the decomposition, the parallel processing of such tensor operations may be advantageous in reducing the time required to complete the tensor operation, thus embodiments of the tensor processor may be advantageous by operating computing decompositions in a parallel manner.

In an embodiment of the first aspect, the plurality of tensor operation modules further instructs the processing element controller to route the component results to form the result of the tensor operation of the tensor.

In an embodiment of the first aspect, the processor is implemented by programming a Field Programmable Gate Array module.

In accordance with a second aspect of the present invention, there is provided a method for processing a tensor comprising the steps of:

- controlling a processing element array, the array having a plurality of processing elements arranged to individually perform operations on variables of a tensor, wherein the processing element array is controlled with a processing element controller to perform tensor operations on a tensor.

In an embodiment of second aspect, the method may increase the flexibility of the processing element array as when it is instructed by a tensor operation module, the processing element controller can generate the control signal for the multiplexers located in the processing element array, which performs the re-route process onto the adders, multipliers and local memory belonging to the processing elements within the same column.

In an embodiment of the second aspect, the processing element controller is arranged to operate the plurality of processing elements in multiple parallel arrays to perform a specific tensor operation in parallel.

In an embodiment of the second aspect, the plurality of processing elements is controlled by the processing element controller to perform tensor operations on the tensor.

In an embodiment of the second aspect, the plurality of processing elements is operated by the processing element controller into multiple parallel arrays, each arranged to perform tensor operations on each of the components of the tensor.

In an embodiment of the second aspect, the tensor operations for each component of the tensor is completed, a operation result is generated.

In an embodiment of the second aspect, the results generated by the processing element array may be configured to be accumulated to determine a result of the tensor operation for the tensor.

In an embodiment of the second aspect, the adders and multipliers and local memory originally located in abstracted processing elements which are in the same processing element column can be real time configured as an adder tree, which can perform accumulation of the previous computed results located in the local memory of the processing elements within a same column.

Preferably, the result output from the processing elements will be read to the corresponding input entries of the newly configured computational structure to perform accumulation over the slice of result tensor of processing elements array.

In an embodiment of the second aspect, the adders and multipliers and local memory originally located in abstracted processing elements which are in the same processing element column can be real time configured as a multiplier adder tree, which can perform the L2-norm of vectors located in the local memory.

Preferably, the result output from the processing elements will be read to the corresponding input entries of the newly configured computational structure to perform L2-norm computation of the vectors located in same column.

In an embodiment of the second aspect, the adders and multipliers and local memory originally located in abstracted processing elements which are in the same processing element column can be real time configured as a tree structure to compute the LI-norm of the vectors located in the local memory within the same processing element column. Preferably, the result output from the processing elements will be read to the corresponding input entries of the newly configured computational structure to perform LI-norm of the vectors in same column.

In an embodiment of the second aspect, the processing element controller receives control signal specific tensor operations control modules of the processor, while the tensor operations control modules receive control signal from the central control unit.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1A:
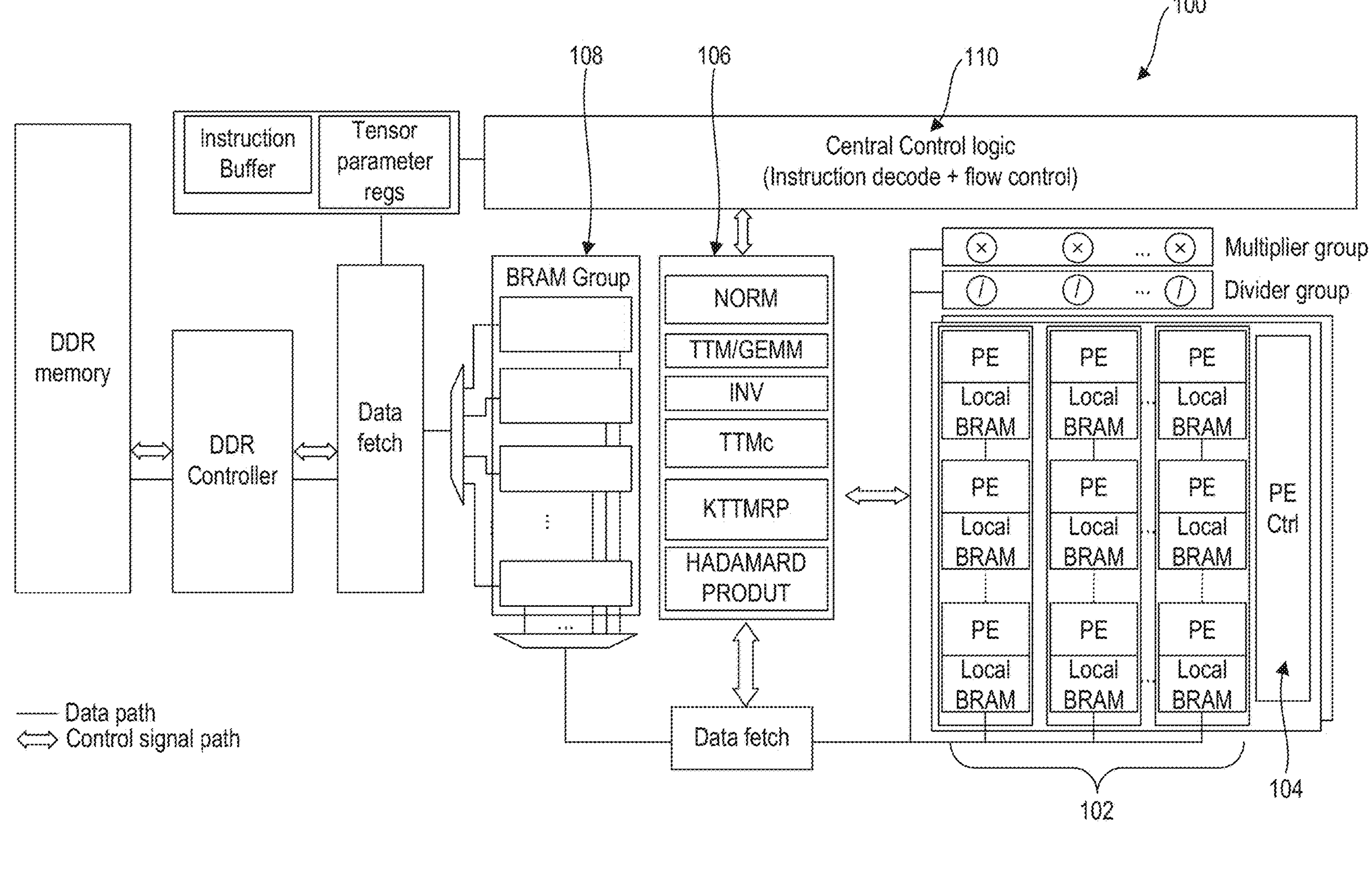
FIG. 1A is a block diagram illustrating the components of a tensor processor in accordance with one embodiment of the present invention.

Referring to FIG. 1A, there is illustrated a block diagram of a tensor processor 100 in accordance with one embodiment of the present invention comprising: two processing element arrays 102, the array having a plurality of processing elements arranged to individually perform operations on variables of a tensor, wherein all the processing elements within a processing element array are individually controlled by a processing element controller 104 to perform tensor operations on a tensor.

Preferably, the processing element controller 104 is arranged to operate the plurality of processing elements 102 in multiple parallel arrays to perform tensor operations in parallel.

In this example embodiment, the processor 100 is arranged specifically to perform instruction and parameters fetch, instruction decode, schedule the tensor operations. Tensor calculations refers to the processing of tensors or tensor data structures which are also referred to, within the field of computer sciences, as multi-dimension arrays (or nth dimension arrays).

Tensor data are becoming more mainstream in real world applications as data collected from real world applications may be collected and presented in multiple dimensions. There are a board range of fields in which data may be presented in multiple dimensions, including applications within computer vision, chemical or molecule modelling, modelling of any real-world application and data manipulations within deep learning networks or related applications. In many of these applications, data may be presented in multiple dimensions, and collectively, in order for these to be processed, various calculations may need to be performed on the collected data in order to obtain a necessary result for further processing, classification or presentation.

Figure 1B:
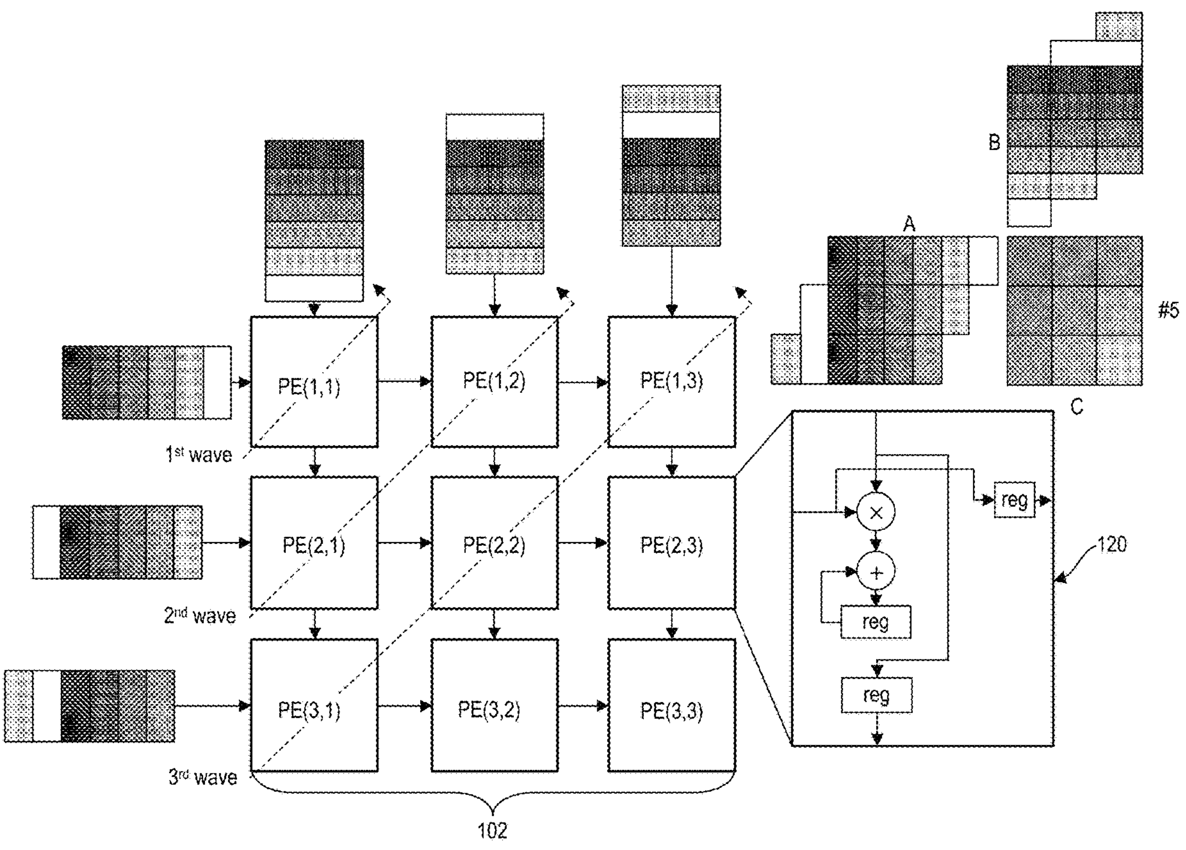
FIG. 1B is a block diagram illustrating an example of an operation of a tensor calculation, which may be interpreted in the form of a basic processing element array design.

To illustrate an advantage of one example embodiment of the tensor processor 100, in a conventional design, it is possible to use a systolic array. With reference to FIG. 1B, there is shown a 3×3 systolic array for matrix multiplication. To illustrate its mechanism, let us assume that we may use the hardware architecture to compute C=AB, where $A\in\mathbb{R}^{3\times 6}$, $B\in\mathbb{R}^{6\times 3}$ and $C\in\mathbb{R}^{3\times 3}$, For the typical design of systolic array, the entries in A(i,:) will pass through all the Processing Elements 120, and as a array 102, in the i-th row, i.e. PE(i,:). The entries in B(:,j) will pass through the j-th column, i.e. PE (:,j).

As shown, it will be shown that, the output register in PE(i,j) associated with the adder store the result of C(i,j) and the initial value of them are all set to 0. At the beginning, i.e. at #0, A(1,1) and B(1,1) are fed to PE(1,1), which are the input of the multiplier.

If it is then assumed in the next timepoint, i.e. at #1, that we are able to get the result of C(1,1)=C(1,1)+A(1,1)×B(1, 1), and we may denote it as the first wave.

Then at #2, denoted as the second wave, PE(1,1) finish the computation of C(1,1)=C(1,1)+A(1,2)×B(2,1), PE (2,1) finish the computation of C(2,1)=C(2,1)+A(2,1)×B(1,1) and PE (1,2) finish the computation of C(1,2)=A(1,1)×B(1,2).

At #3, the third wave, the PE(i,j), i+j≤4, will finish the computation.

At #4, the PE(i,j) will finish the computation, while i+j≤5.

At #5, all the PE will have result output. At this moment, we called the systolic array as "saturated". As shown in FIG. 1B, each wave would proceed in a diagonal fashion.

We may then re-align the entries of A and B such that the entries of A within the same column would input to the PE array at the same timepoint, and entries of B within the same row would input to the PE array in the same timepoint.

Accordingly, it may be observed that, in this traditional design, the computation delay of the adder in each PE 120 should be restricted to 1 clock cycle, as in each clock cycle, the adder should fetch the previous result to add with the result of the multiplier. For the floating-point arithmetic, the add operation always requires multiple clock cycles. Therefore, in order to address this concern, it may be adapted to use floating point arithmetic, and to replace this systolic array design with a PE array architecture 102. This design majorly enlarges the input buffer of each processing array and output buffer. The propagating network within the processing elements are also deleted.

In this example embodiment, as shown in FIG. 1A, the tensor processor 100 is implemented to include two arrays of processing elements (PE) array 102, and thus is an example of a processor 100 which includes a PE array architecture 102. The arrays 120 is a type of in memory computing, where all the local copy of data are near the operators in a processing element.

Preferably, the PE within PE arrays (e.g. 120) may include an adder, multiplier and input memory and output memory in its base unit, together with multiple multiplexers arranged to be controlled by a processing elements controller so as to perform the double buffering for the results. As it will be described below in details with reference to FIGS. 1A, 1C to 5, this array of processing elements 102 may be controlled in such a way that the processing elements 102 may function as two or more parallel arrays of processing elements which may then operate to process the divided components of a tensor, and thus effectively dividing the tensor calculation into multiple parallel components. By this way, each processing element array may be able to process such small block of data. The small blocks may also enable the pipeline architecture for the two processing element arrays design. The small blocks can also be processed in different processing element array independently. The number of the processing elements in the two arrays are set to be different which taking work-load balance in consideration.

As is the case with tensor calculation, due to its multi-dimensional characteristics, the results may be accumulated, to create the final result.

Once each of the factorized terms or components are processed by each PE array, the results may then be accumulated into a final result which would then be the complete result of the tensor calculation. This process is done by the multiplexers. The enable signal of the multiplexers are generated by the processing element controller 104. Once the accumulated process needs to be started, all the multiplexers for re-route will be enabled. The wiring is changed, so that when the processing element controller fetch the data and feed to the data bus, the data will be redirected after they passed the multiplexers, which is denoted as the re-route process of the data flow among the local memory and operators within one processing element column. This process makes the in-memory computing feasible. Since the intermediate result computed in previous stage which is located in the local memory of the processing element array can be accumulated in the same computing architecture, there is no time consumption to transfer the data to another accumulation architecture and do the same thing.

Preferably, in order to operate the Processing Element Controller so as to perform the tensor calculations by using the same processing element array structure, the processor includes six major tensor manipulation modules 106 which would instruct the PE controller 104. These major tensor manipulation 106 modules include:

- A NORM module for performing a maximum normal of each columns of a matrix and for performing an Euclidean normal of each column of a matrix;
- A TTM/GEMM module for performing Tensor Matrix and Matrix-Matrix Multiplication;
- A INV module for performing matrix inversions;
- A TTMc module for performing tensor times matrices chain (TTMc) operations;
- A MTTKRP module for performing matrized tensor times Khatro-Rao product operations; and,
- A HADAMARD PRODUCT module for performing Hadamard product operations.

In this embodiment, these modules 106 are each arranged to perform a specific matrix calculation by controlling the PE controller 104, which will in turn control the PE arrays 103 to perform the actual calculations as required.

During these operations, the PE controller 104 may be specifically instructed by each of these modules 106 to perform any necessary decomposition to the tensors so as to take advantage of the unique structure of the tensor processor 100 to perform the calculations. The modules are instructed to operate via an associated instruction set 110 which will be used or implemented in a program by a programmer or a compiler. An example of the instruction set, and their operations with an example of the tensor processor 100 will be described further below.

By using the unique structure of the tensor processor 100, the tensor operation can be accelerated by the same processing element array. If the temporary result computed in the previous stage need to be accumulated, the structure can perform in-cite accumulation, which resulting in a faster and more efficient processing of the tensor as compared to other computing architecture.

Figure 2:
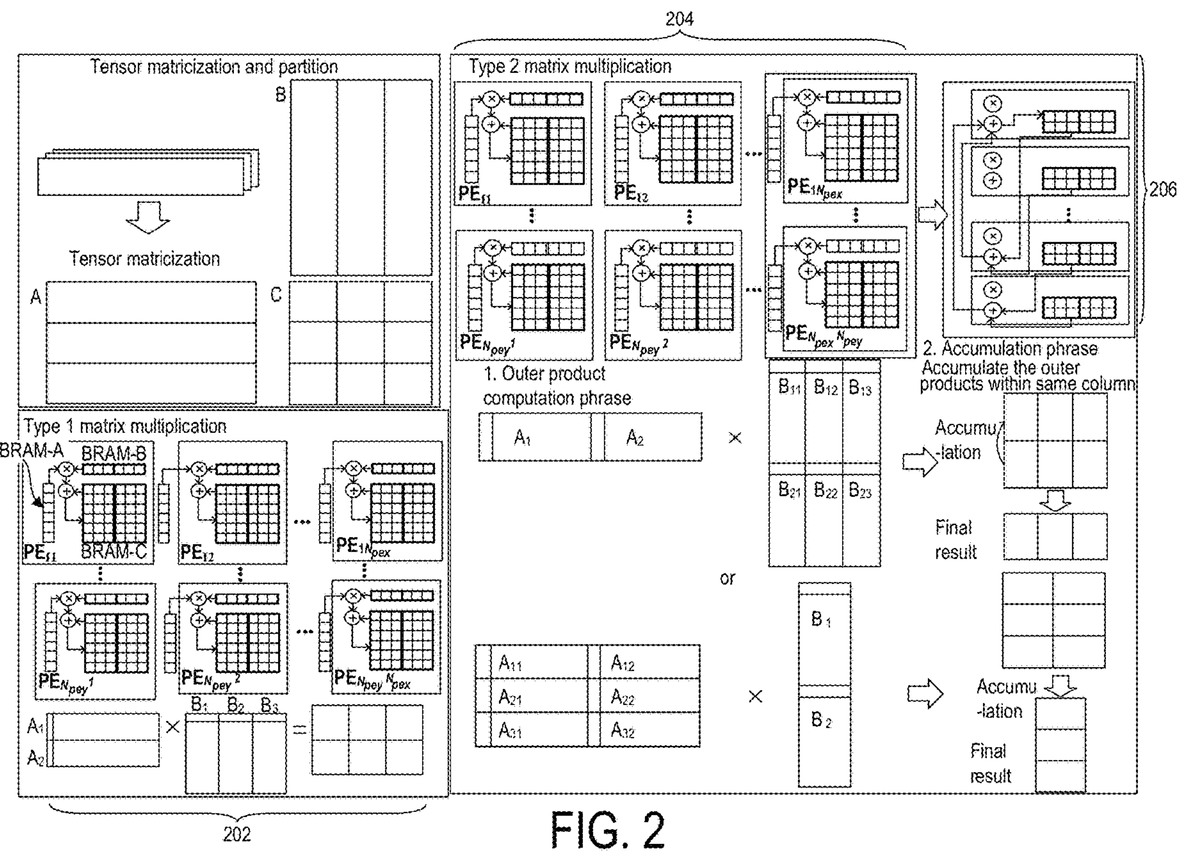
FIG. 2 is a block diagram illustrating the data mapping amongst the processing elements for the two type matrix multiplication as performed by the tensor processor of FIG. 1A.

Examples of how the data 108 is dispatched amongst the processing elements for two types of matrix multiplication, and how it is accumulated after the matrix multiplications are completed is shown in FIG. 2. In this figure, a three-dimensional tensor is flattened into a matrix A and will be multiplied by the matrix B, which in turn may be processed in the type 1 and type 2 matrix multiplications (202, 204). If the length of the second dimension of matrix A is too large and the length of the first dimension of matrix A is too small, then the second type 2 matrix multiplication (204) will be used.

The end result, may then be accumulated during the accumulation phase 106 to produce the final tensor matrix multiplication results. The net advantage in this example, is that the previous generated result can be accumulated in-cite, so that no extra effort to transfer the data to another accumulation structure and construct such accumulation structure. A further worked examples of matrix multiplication is further described below with reference to FIG. 2 and examples of how each of the six modules 106 performs its calculation.

Figure 3A:
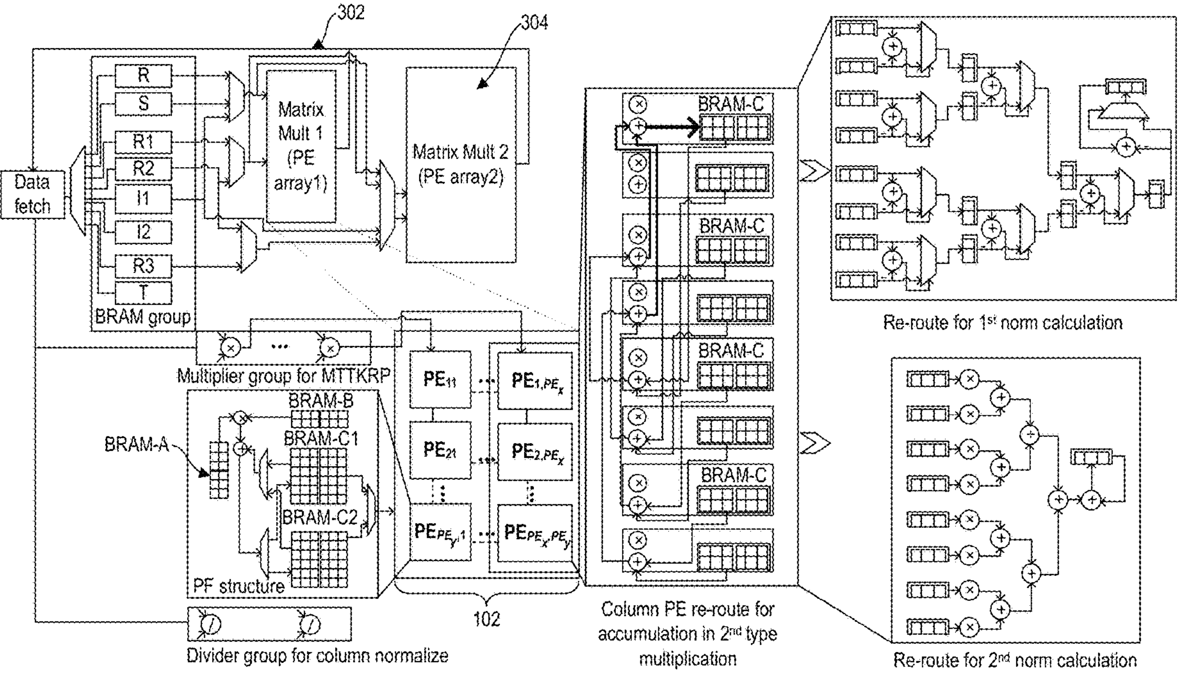
FIG. 3A is a modular diagram of the two processing elements array (left half of the diagram), and the three real time regenerated computational structure by re-route the computation resources and memory locate in the processing element column (right half of the diagram)
Figure 3B:
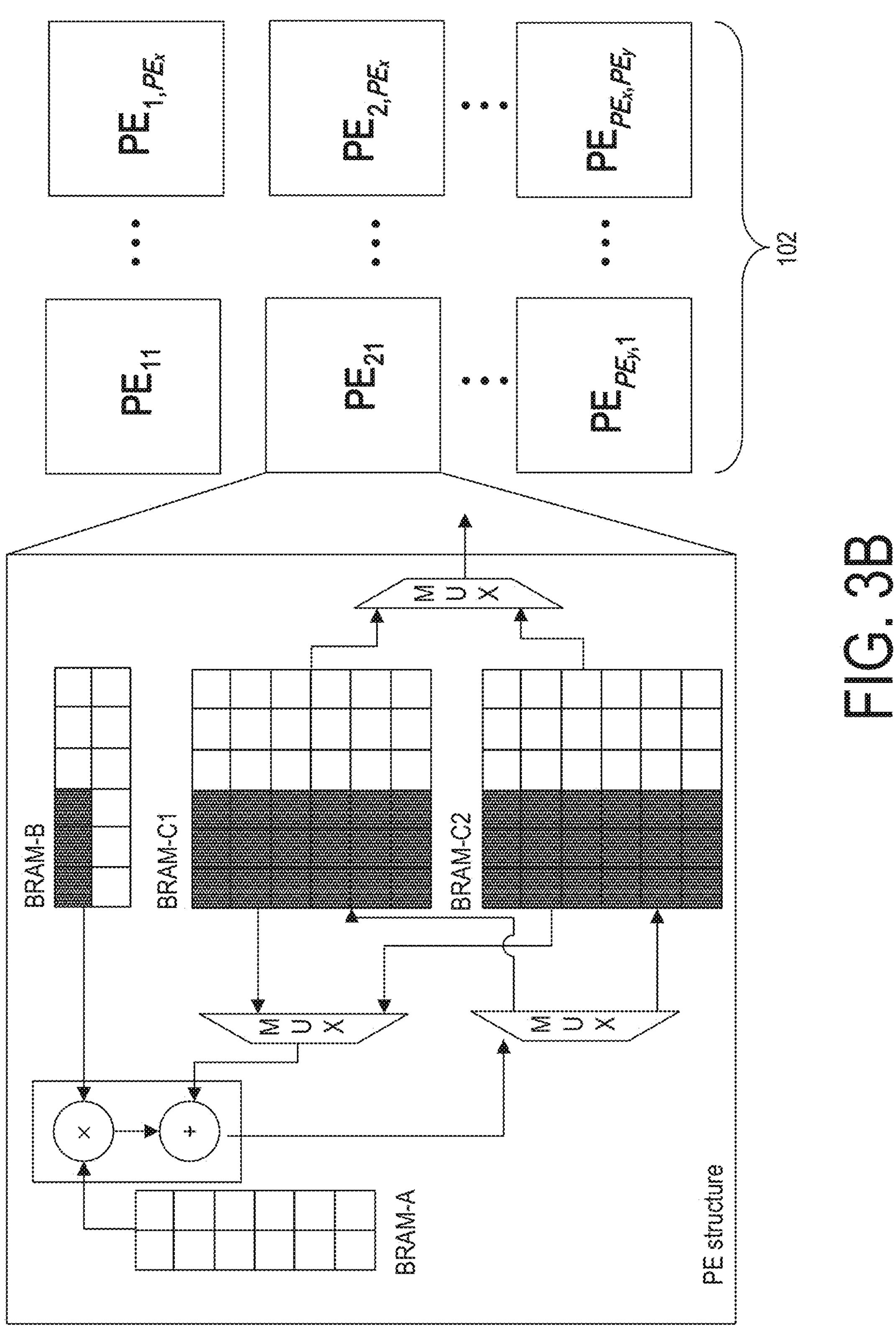
FIG. 3B is an enlarged diagram of one of the processing elements array in FIG. 3A.

With reference to FIGS. 3A and 3B, there is illustrated an example of a dual parallel PE arrays 302, 304 of the tensor processor 100 in operation. In this example, each of the PE may be rerouted by the PE controller in accordance with the desired calculations. The re-routing procedures, which are controlled by the PE controller and implemented through the multiplexers, is further described below with reference to the operations of the TTMc module below.

As it will be described herein and below, the structure of an example embodiment of the tensor processor 100 will be further described. Furthermore, as part of this description, a set of instructions for tensor calculations implemented to take advantage of this structure will also be described and thus together, operations used for tensor calculations may in turn be performed in parallel by the tensor processor 100. Therefore, by taking advantage of this parallel architecture, the processor 100 may be able to achieve a faster processing time of tensor calculations when compared with other processors based on standard architectures. Mathematical demonstration of the calculation may also be used in this description to illustrate an example operation of one embodiment of the tensor processor 100.

Without wishing to be bound by theory, the inventors have, through research, trials and experimentations, found that for tensors or other matrix structures, there exists multiple types of decomposition methods. The decomposition concept may be also extended to higher dimensional space data structures. Tensor decomposition is a method to express a tensor with a sequence of sums and products operating on multiple smaller and simpler multidimensional array. In other words, by using tensor decomposition, it is possible to approximate a tensor by multiple factorized terms.

In matrix analysis, singular value decomposition (SVD) is of great significance. As a multidimensional extension of SVD, there is Tucker decomposition. Another basic tensor decomposition is called CANDECOMP/PARAFAC decomposition (CPD), which can be viewed as a special case of Tucker decomposition. Tensor decomposition is used in many fields including computer vision, machine learning, signal, image and video processing. For example, CPD can be used in signal separation and exploratory data analysis. After the decomposition, it is possible to get core properties of the signal through the rank-1 factors.

To perform tensor decompositions, multiple tensor computations are introduced. It is preferable to optimize such tensor computations. The computational complexity of tensor decomposition may be high. For example, the complexity of the algorithm for CPD is proportional to I, J, K, R where I, J, K are the size of each dimension and R is rank. Although there have been several attempts on accelerating dense tensor computation, these acceleration attempts are limited in performance advantages.

Accordingly, example embodiments of the tensor processor 100 may offer the following advantages in performing tensor calculations:

By using a pipeline strategy and resource sharing, an efficient parallel processor design for the processing elements (PE) re-route for 2 kind of NORM calculation, the tensor computation kernel may be implemented by a unified PE array.

The tensor processor 100 structure allows for the optimization of thin and tall matrix multiplication by adding an accumulation phase, by using a set of multiplexer to implement PE elements re-route. In this way, the processor may use all the PE elements to do the calculation.

Example embodiments of the tensor manipulation modules of the tensor processor defines two types of tensor times matrices chain (TTMc) operations. In one example, by partitioning the large TTMc computation into smaller TTMc calculation, the design may reduce the data movement between main memory and FPGA on-chip memory with the size of O(I^2), where I is the maximum range among all the dimensions of the data tensor. Example structure of the tensor processor 100 have achieved a 2 times faster than GPU in the application of 3D volumetric dataset rendering by tensor approximation during testing.

Returning to FIG. 1A, which illustrates the overall architecture of an example tensor processor 100, in this example, the host interface may be implemented by AXI4 bus. It is responsible for receiving instructions, tensor parameters. For the processor architecture, it is possible to use FIFOs to BRAM to receive and store the incoming instructions and corresponding tensor parameters 110. Once the FIFO is not empty and the processor 100 is available to compute, the cached instructions and the corresponding parameters will be fetched and decoded.

In tensor decomposition operations, in order to make the computation more efficient, there is included six tensor manipulation or tensor operation modules 106 to execute the basic operations. These include:

Matricized tensor times Khatri-Rao product;

Hadamard product;

Tensor times matrix and matrix multiplication;

Matrix inversion;

Normal (norm) calculation and normalize calculations; and,

Tensor times matrices chain (TTMc) module.

In this example, the central control module 110 is used to decode the instructions, issue start signal to different functional modules 106, send the corresponding parameters to the six tensor manipulation modules 106, and also to monitor the status of the whole execution. The PE module 102 is the part that comprises the actual computation units, and it is controlled by the six tensor manipulation modules 106 which will also control the PE controller 104 to implement different computations. In this arrangement, there are two PE groups 102 with any number of PEs within each group. The number of the PEs in the first group is $N_1$. and the second is $N_2$. The users have the responsibility to send instructions, which can be implemented by the program running on CPU. It is expected that there may be more than two PE groups and as for the number of PEs in each group, this can be dependent on a preferred implementation, although the inventors had, during their trials and experiment, experimented with 51 or 27 PEs in total.

In this example, for the storage system, 8 groups of BRAMs 108 were implemented to store the useful data. BRAM tensor is a group of BRAMs that store the input tensor data, while BRAM R1 to R3 are a group of BRAMs that cache the result matrix. In CP decomposition, these BRAMs are used to store the CP factorized matrix A, B and C. Intermediate BRAM I1 and I2 are two BRAMs that cache the intermediate results, which can be reused in the subsequent computation process. In order to manage these BRAMs and integrate them with the computation modules we also implement the data transfer modules to pass the data between PE modules and corresponding BRAMs. In the following part, the design of each tensor manipulation module will be described in further details.

The inventors have found in their trial and experiments, that from the CP decomposition algorithm which is described herein was found to require a large amount of tensor-matrix and tensor-vector multiplications. On the other hand, from the HOOI algorithm in the same section below, it was also found that there was a need to perform a large number of tensor times matrix operations.

Therefore, the inventors devised that if a processor has a parallel architecture to perform the computation among tensors, matrices and vectors, the efficiency may well be improved. Accordingly, a tensor processor 100 as described with reference to FIGS. 1A, 1C to 3, may be advantageous to accelerate the core tensor computation. Experiments performed by the inventors to implement such a parallel processor architecture was performed with an FPGA. The calculations that may be performed with this example implementation with an FPGA, together with a description of the mathematics of each operation as well as its performance is described below.

Prior to describing the tensor calculations which may be performed by one example embodiment of the tensor processor 100, the inventors herein describe the background knowledge of tensor computation operations and suitable notations so as to describe the subsequent functions of the each of the tensor manipulation modules and how this example embodiment of the tensor processor 100 is able to operate in parallel so as to provide an advantage in tensor calculations.

Without wishing to be bound by theory, the notations and the background knowledge of basic tensor computations are introduced.

Notation

Please refer to the notation is listed as Table I below. By default, the tensor we described herein refers to the 3-dimensional tensor and the vector is column vector.

TABLE I

| Notations | | | |
|---|---|---|---|
| Notation | Definition | Notation | Definition |
| 1, I, $\lambda_r$ | scaler | $A \otimes B$ | Kronecker product |
| a | vector | $A \odot B$ | Khatri-Rao product |
| A | matrix | $A * B$ | Hadamard Product |
| A(i, j) | matrix entry | $a \circ b$ | vector outer product |
| $\mathcal{X}$ | tensor | $A \cdot B$ | matrix multiplication |
| $\mathcal{X}$(i, j, k) | tensor entry | $A^+$ | matrix inverse |
| $a_i$ | the i-th column of matrix A | $\mathcal{X} \times_n A$ | tensor times matrix(TTM) |
| $X_{(n)}$ | mode-n matricization | $\mathcal{X} \times_1 A \times_2 B$ | tensor times matrix chain(TTMc) |

Tensor and Tensor Computations

1 Tensor fibres: Suppose we have a 3-dimensional tensor $\mathcal{X}$. A tensor fibre is a vector derived by fixing every index but one. If we fix every index but mode 1, we call this a mode-1 fibre, which is denoted as $\mathcal{X}$(:,j,k). Similarly, a mode-2 fibre and a mode-3 fibre of a 3-dimensional tensor can be denoted as $\mathcal{X}$(i,:,k) and $\mathcal{X}$(i,j,:) respectively.

2 Tensor matricization: This process is to unfold a tensor as a matrix. The mode-n tensor matricization of $\mathcal{X}$ is denoted as $X_{(n)}$, which is generated by arranging all the mode-n fibres as the columns of the result matrix.

3 Tensor times matrix (TTM): A mode-n tensor times matrix operation is denoted as $\mathcal{X} \times_n A$. This is equivalent to the matricization tensor times a matrix, i.e. $\mathcal{X} \times_n A = AX_{(n)}$ 4 Vector outer product: As all the vector are column vectors as default, vector outer product between a and b is denoted as $a \circ b$, which equals to $a \cdot b^T$. The 3 vectors outer product is defined as $\mathcal{Y} = a \circ b \circ c$, where $\mathcal{Y}(i, j, k) = a(i) \cdot b(j) \cdot c(k)$ 5 Matrix Kronecker, Khatri-Rao and Hadamard products: The Kronecker product of matrix $A \in \mathbb{R}^{1 \times R}$ and $B \in \mathbb{R}^{J \times S}$ denoted as $A \otimes B \in R^{IJ \times RS}$, is defined as follows.

$$A \otimes B = \begin{pmatrix} A(1,1)B & A(1,2)B & \dots & A(1,R)B \\ A(2,1)B & A(2,2)B & \dots & A(2,R)B \\ \vdots & \vdots & \ddots & \vdots \\ A(I,1)B & A(I,2)B & \dots & A(I,R)B \end{pmatrix} = [a_1 \otimes b_1, a_1 \otimes b_2, \dots, a_R \otimes b_{S-1}, a_R \otimes b_S] \quad (1)$$

The Khatri-Rao product of matrix $A \in \mathbb{R}^{I \times R}$ and $B \in \mathbb{R}^{J \times R}$ denoted as $A \odot B \in \mathbb{R}^{IJ \times R}$, is defined as follows.

$$A \odot B = [a_1 \otimes b_1, a_2 \otimes b_2, \dots, a_{R-1} \otimes b_{R-1}, a_R \otimes b_R] \quad (2)$$

The Hadamard product of matrix $A \in \mathbb{R}^{I \times R}$ and $B \in \mathbb{R}^{I \times R}$ denoted as follows $$C = A * B, \text{ where } C(i, j) = A(i, j) \cdot B(i, j) \quad (3)$$

6 Typical tensor decomposition methods: Among all the tensor decomposition methods, there are two basic types. One is called CANDECOMP/PARAFAC decomposition (CPD) The target of CP decomposition is to factorize a tensor with a sum of outer products of vectors. Suppose $\mathcal{X} \in \mathbb{R}^{I \times J \times K}$ is a three-way tensor. Performing CP decomposition on a tensor $\mathcal{X}$ means to find $$\min_{\hat{\mathcal{X}}} \|\mathcal{X} - \hat{\mathcal{X}}\| \text{ with } \hat{\mathcal{X}} = \sum_{r=1}^{R} \lambda_r a_r \circ b_r \circ c_r \quad (4)$$

In Equation 4, the operator o denotes the vector outer products. while $a_r \in \mathbb{R}^I$, $b_r \in \mathbb{R}^J$ and $c_r \in \mathbb{R}^K$ are called rank one factors. We assume the rank of the tensor $\mathcal{X}$ is R anc it is low enough, i.e. we only consider the low rank factorization case. If we stack the R rank one factors as a matrix we can obtain $A=[a_1; a_2; \ldots ; a_R]$, $B=[b_1; b_2; \ldots ; b_R]$ $C=[c_1; c_2; \ldots ; c_R]$ It is not easy to solve the above problem because it is no convex. We can use the alternating least squares method (ALS) to perform the decomposition. which is the workhorse of CF decomposition. It is illustrated as Algorithm 1. In this paper we assume $\text{rank}(B^TB*A^TA)=\text{rank}(C^TC*B^TB)=\text{rank}(C^TC*A^TA)=R$ Algorithm 1 Alternating Least Squares for CP decomposition

```
     Input: Tensor X and rank R;
     Output: CP decomposition λ, A, B, C;
1:   Initialize: A, B, C.
2:   while convergence criterion not met do
3:     A = X_(1) (C ⊙ B) (C^T C * B^T B)^+
4:     Normalize columns of A
5:     B = X_(2) (C ⊙ A) (C^T C * A^T A)^+
6:     Normalize columns of B
7:     C = X_(3) (B ⊙ A) (B^T B * A^T A)^+
8:     Normalize columns of C and store norm in λ
9:   end while
```

Another basic type of tensor decomposition is called Tucker decomposition (TKD). It is known that TKD is a form of higher-order extension of principal component analysis (PCA) Such decomposition can be done through higher order singular value decomposition (HOSVD) [10], [11], which provides a powerful tool for spectrum analysis. To perform Tucker decomposition means to find $$\min_{\hat{\mathcal{X}}} \|\mathcal{X} - \hat{\mathcal{X}}\| \text{ with} \quad (5)$$

$$\hat{\mathcal{X}} = \sum_{p=1}^{R_1} \sum_{q=1}^{R_2} \sum_{r=1}^{R_3} g(p, q, r) a_p \circ b_q \circ c_r = \mathcal{G} \times_1 A \times_2 B \times_3 C$$

where $\times_x$ represents tensor product and $A \in \mathbb{R}^{I \times R_1}$, $B \in \mathbb{R}^{J \times R_2}$, $C \in \mathbb{R}^{K \times R_3}$ are the three factor matrices and $G \in \mathbb{R}^{R_1 \times R_2 \times R_3}$ is called core tensor. It is easy to find that, if core tensor become a super-diagonal tensor Tucker decomposition is degenerated to CP decomposition. $R_1$, $R_2$ and $R_3$ are much smaller than I, J, K, therefore, core tensor usually can be viewed as a compressed one of $\mathcal{X}$. In terms of data compression, Tucker is superior to CP. Another advantage of using Tucker decomposition is that, it can capture non-trilinear variation which CP cannot capture [12]. Unlike CPD, it is not easy to interpret. A typical algorithm for computing Tucker decomposition is called higher order orthogonal iteration (HOOI) as Algorithm 2.

Algorithm 2 HOOI for Tucker decomposition

```
     Input: Tensor X ∈ R^(I×J×K) and rank R1, R2, R3;
     Output: Tucker decomposition G, A ∈ R^(I×R1), B ∈
R^(J×R2), C ∈ R^(K×R3);
1:   Initialize: A, B, C using HOSVD.
2:   while convergence criterion not met do
3:     Y = X ×_(2) B^T ×_(3) C^T
4:     A ← R1 leading left singular vectors of Y_(1).
5:     Y = X ×_(1) A^T ×_(3) C^T
6:     B ← R2 leading left singular vectors of Y_(2).
7:     Y = X ×_(1) A^T ×_(2) B^T
8:     C ← R3 leading left singular vectors of Y_(3).
9:   end while
10:  G ← X ×_(1) A^T ×_(2) B^T ×_(3) C^T
```

Instruction Set

Since there are many kinds of different tensor computation: processes, as a start, a set of basic operations are implemented as instructions. They include the following operations, TTM (tensor times matrix), MTTKRP (matricized tensor times Khatri-Rao product), HP (Hadamard product), INV (matrix inversion), MNORM (maximum norm), ENORM (Euclidear norm), TTMc (Tensor times matrices chain). We also implement a series of MOV instruction to move the data from one RAM to another RAM. The whole instruction set is shown as Table II. There are 19 instructions in total.

Design Flow with an Example of a Tensor Processor

To use the processor design, given a tensor algorithm, the users are responsible for partitioning the algorithm into the processor code and C code running on host processor. Then for the processor code, the instructions and the parameters together with the required block of data will be sent to the processor design. The processor will cache them and execute the instructions when it is vacant. For the special operations which are not supported by the processor will be implemented by C code using the established library like Intel math kernel library (MKL). The software code is also responsible to receive the data and combine them with the result given by C code to form the final result. In addition, it is possible to combine the flexibility of using C code with the high efficiency computations provided by the processor design.

Two Processing Element Arrays Design

As we show in FIGS. 3A and 3B, the tensor processor 100 includes two processing element (PE) arrays (302, 304) to do the computation. In order to add the flexibility of this implementation, the two PE arrays (302, 304) could be configured to execute independently or work cooperatively, i.e as a pipeline architecture.

The architecture of the PE array 102 is shown in FIG. 1A. To illustrate the operation mechanism of each PE, we plot the figure as FIG. 1C. Basically, the processing element is used to compute the General matrix multiplication. For C=A·B, while $C \in \mathbb{R}^{I \times J}$, $A \in \mathbb{R}^{I \times K}$ and $B \in \mathbb{R}^{K \times J}$, we compute a series of outer products and accumulate them to derive the result, i.e.

$$C = \Sigma_{i=1}^{K} A(:, i) \circ B(i, :)$$

Figure 1C:
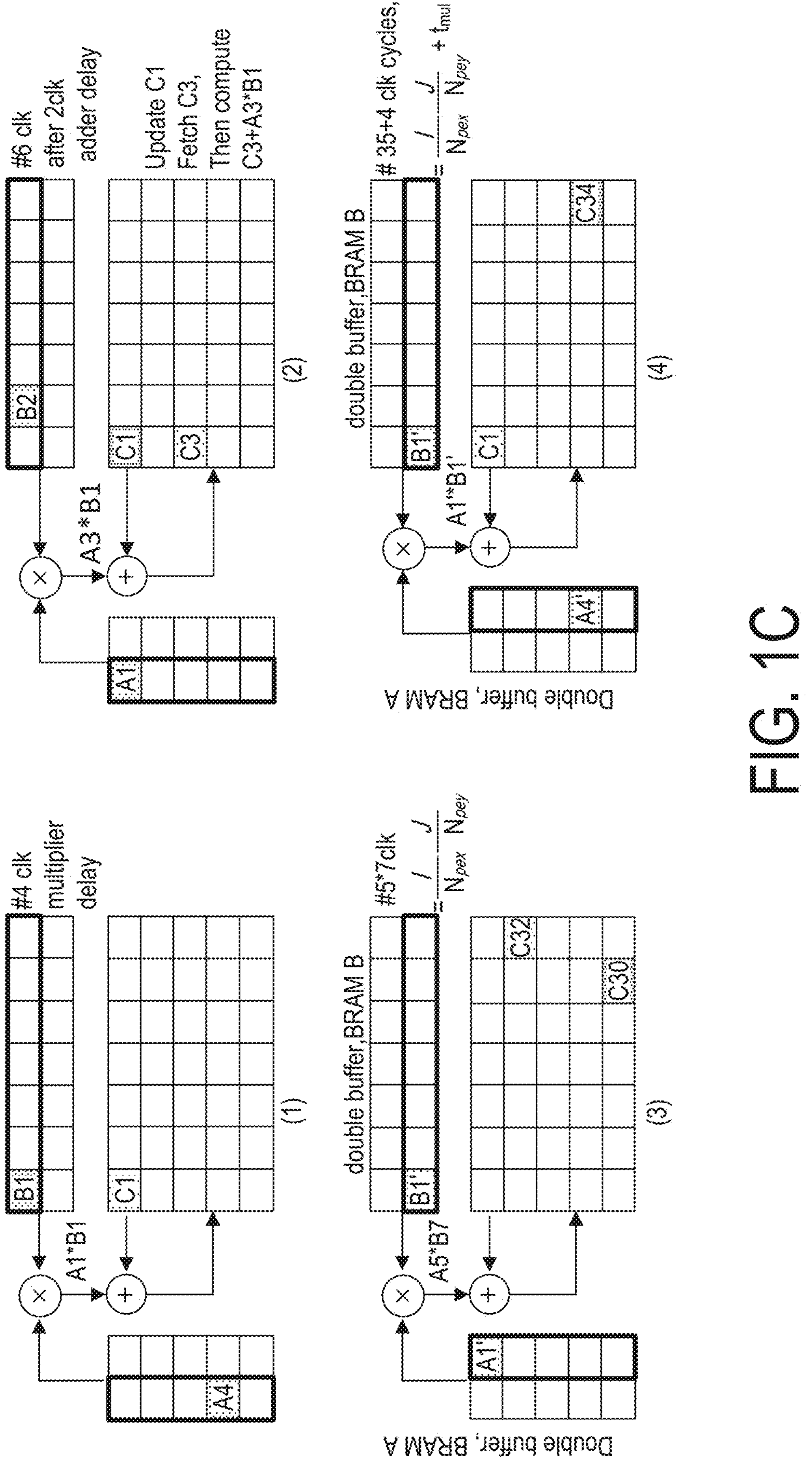
FIG. 1C is a block diagram illustrating an example of a single processing elements of FIG. 1A.

Each processing elements is responsible to compute a partition of the product (or a variable of the operation). To make it clear, the running mechanism of each PE is visualized as FIG. 1C. In this example, we assume the multiplier delay is 4 clock cycles and adder delay is 2 clock cycles. And each PE will process a partial column of A with the size of 5, and a partial row of B with the size of 7. At #0, A1 and B1 feed to the multiplier. After 4 clock cycles, which is shown in FIG. 1C(1), the multiplier output the result of A1*B1, then, another feeder will fetch the first entry of the local BRAM C, i.e. C1 to add with A1*B1. At #6, which is shown in FIG. 1C (2), the adder will output the result of C1+A1*B1, then the feeder will update the result in C1. At the same time, the multiplier output the result of A3*B1, and the feeder would fetch C3 to the input of adder. At 35, which is shown in FIG. 1C(3), the first partial column of A and the first partial row of B will all be fed to the multiplier.

At this moment, the feeder will fetch the entry in next column of A and next row of B to the multiplier. The adder output will be used to update C30, while C32 will be fetched to the adder input to be added with A5*B7. At #39, which is shown in FIG. 1C(4), the feeder will fetch A4' and B1' to the input of the multiplier. At this moment, the multiplier output the result of A1'*B1', and the feeder fetch C1 to the input of the adder.

The adder may then output the result and update C34. Throughout the process, it is clear that, we do not need to constraint the adder delay to 1 clock cycle, which is preferable in floating point arithmetic. Compared with the traditional systolic design introduced in previous section, the output register is expanded from 1 to N, which is equal to the BRAM size of BRAM c. As a result, we don't need to accumulate the previous result immediately.

In tensor times matrix chain (TTMc) operation, the two PE arrays will execute different tensor times matrix operations. For TTMc1, the first PE array will compute $$I = X_{(1)}^{k\top} A^{\top},$$

and the result will be stored at BRAM I1. Then, the second PE array will execute the B·I. For TTMc2, the first PE array will compute $$I_1 = A_m^T S_{(1)} \text{ and } I_2 = B_n^T I_{1(2)}.$$

The second PE array will compute $$T = C_l^{\top} I_{2(3)}.$$

By partitioning the large TTMc operations into small TTMc sub-operations, the architecture of two PE arrays along with the intermediate result BRAMs I1 and 12 can execute the small TTMc tasks in a pipeline fashion. In this scenario, the pipeline architecture can avoid the intermediate data movement which is introduced by the multiplication chain process.

On the other hand, the two PE array can be configured to work independently.

Tensor-Matrix and Matrix-Matrix Multiplication

Based on the tensor times matrix (TTM) is equivalent to multiply a flattened tensor, i.e. a matrix, with another matrix. Compared with standard matrix multiplication, the only extra operation is that we should flattened the tensor in a specific mode. In a preferred embodiment, we do not first flatten the tensor and store it in BRAM. We implement a data fetch module to fetch appropriate entries and then feed them to BRAM-A or BRAM-B in FIGS. 3A and 3B for the follow-up computation. Therefore the data fetch module is responsible to do the tensor mode transformation.

As shown in FIGS. 3A and 3B. $N_{pex}$ denotes the number of PEs in each row, and $N_{pey}$ denotes the number of PEs in each column. Basically, for C=A·B, where $A\in\mathbb{R}^{I\times r}$, and $B\in\mathbb{R}^{r\times J}$, we optimize the calculation of two types of matrix multiplication For the first type, both J and I are not small, which is shown in FIG. 2. All the PE works individually during the whole computations. In this case, we can easily divide B by $N_{pex}$ horizontally as $B=[B_1; B_2; \ldots; B_{N_{pex}}]$. Likewise, A is divided by $N_{pey}$ vertically as $$A = \left[A_1^T; A_2^T; \ldots ; A_{N_{pey}}^T\right]^T.$$

In our matrix multiplication module, we should first feed a row of B and a column of A to the PE for computing vector outer product and wait for the result. A column of a partition of A, i.e. Ay, is shared among the y-th row of PE, i.e. $PE_{y,:}$. A row of a partition of B, i.e. $B_x$, is shared among the x-th column of PE, i.e. $PE_{:,x}$. We demonstrate the data fetching scheme of matrix A and B in FIG. 2, where the same colour refers to the same data. After all the columns in A and rows in B having been fed to the PE array, the BRAM-C in each PE contains a small part of the final matrix multiplication result.

In order to derive the restriction of I and J when we need to use this type of matrix multiplication scheme, we have the following analysis. For each time we load the PEs with a row of B and a column of A, we need max{I,J} cycles. To compute a slice of outer product, we need $(J/N_{pex})\cdot(I/N_{pey})$ cycles. To ensure the required entries from input matrix get ready before calculation start, we have the inequalities as follows.

$$\max\{I, J\} < (J/N_{pex})\cdot(I/N_{pey}), \text{ thus} \tag{6}$$

$$I > J > N_{pex}\cdot N_{pey} \text{ or } J > I > N_{pex}\cdot N_{pey}$$

For each entry, the multiply and add result should be available before the PE access the same entry of BRAM-C to compute next slice. Therefore, we have the inequality as follows, where $t_{mul}$ denotes the clock cycles of computation delay of multiplier and $t_{add}$ denotes the clock cycles of the computation delay of a adder.

$$t_{mul} + t_{add} < (I/N_{pey})(J/N_{pex}), \text{ thus } IJ > (t_{mul} + t_{add})N_{pex}N_{pey} \tag{7}$$

Assume the size of BRAM-A and BRAM-B in each PE elements are equal to T, then we have the inequality as follows $$I < N_{pey}\cdot T,\ J < N_{pex}\cdot T \tag{8}$$

In combination of Equation 7 and 9, we have the inequality as follows.

$$J > (t_{mul} + t_{add})N_{pex}/T \text{ and } J > I \text{ or} \tag{9}$$

$$I > (t_{mul} + t_{add})N_{pey}/T \text{ and } I > J$$

Though we can increase the write frequency to BRAMs to make these constraints easily satisfied, it is not feasible when the entries fed to BRAMs should be computed in the fly However, this is required in MTTKRP module, in our design to minimize storage usage. In ALS algorithm, matrix products like $[X_{(1)}(C \odot B)]\cdot[(C^TC*B^TB)^+]$ can be computed by this scheme.

For the second type, matrix $A \in \mathbb{R}^{I\times r}$ is fat and short. In other words, r is big and I is small. Since r is large a straight-forward method is to divide input matrix A into $N_{pey}$ parts horizontally, i.e. $A=[A_1; A_2; \ldots ; A_{N_{pey}}]$ as FIG. 2. Matrix B is divided into $N_{pey}$ parts vertically and then $N_{pex}$ parts horizontally. Each block matrix is denoted as $B_{ij}(i=1, 2, \ldots, N_{pey}, j=1, 2, \ldots, N_{pex})$. In the first phase we feed the corresponding columns of $A_j$ and rows of $B_{ij}$ as FIG. 2. After all the columns of $A_i$ and rows of $B_{ij}$ are fed to the PE array, each BRAM-C in the PE array contains the result of $A_iB_{ij}$. Then we execute the second phase, accumulation phase. In this moment, we re-route the PEs within a column to form an adder tree, which is shown in FIGS. 3A and 3B. In our design, for the first PE array, we restrict the number of PEs within a column to 8. We can also set it to any other number which is power of 2. A PE control module will read the entries of each BRAM-C one by one. After $3*t_{add}$ clock cycles, PE control module will store the results derive from the ultimate adder to the first BRAM-C. By this way, all the sub-matrices derived in the first phase will be accumulated to the first BRAM-C, i.e.

TABLE II

| Instruction Set | | |
|---|---|---|
| Microcode | opcode | operation |
| TTM1 × A | 0 × 01 | $X_{(1)}A$ |
| TTM2 × A | 0 × 02 | $X_{(2)}A$ |
| TTM3 × A | 0 × 03 | $X_{(3)}A$ |
| MTTKRP1 × A B | 0 × 04 | $X_{(1)}(A \odot B)$ |
| MTTKRP2 × A B | 0 × 05 | $X_{(2)}(A \odot B)$ |
| MTTKRP3 × A B | 0 × 06 | $X_{(3)}(A \odot B)$ |
| TTMC1 × A B | 0 × 07 | $\mathcal{X} \times_{(1)} A \times_{(2)} B$ |
| TTMC2 S A B C | 0 × 08 | $\mathcal{S} \times_{(1)} A^T \times_{(2)} B^T \times_{(3)} C^T$ |
| MULTTHP A B | 0 × 09 | $A^TA \odot B^TB$ |
| MULT A B | 0 × 0 a | $A \cdot B$ |
| INV A | 0 × 0 b | $A^{-1}$ |
| MNORM A | 0 × 0 c | calculate the maximum norm of each column of matrix A |
| ENORM A | 0 × 0 d | calculate the Euclidean norm of each column of matrix A |
| MOVP1R1 PE1 R1 | 0 × 0 e | move PE1 cache to result matrix R1 |
| MOVP1R2 PE1 R2 | 0 × 0 f | move PE1 cache to result matrix R2 |
| MOVP1R3 PE1 R3 | 0 × 10 | move PE1 cache to result matrix R3 |
| MOVP2I1 PE2 I1 | 0 × 11 | move PE2 cache to intermediate matrix I1 |
| MOVP2I2 PE2 I2 | 0 × 12 | move PE2 cache to intermediate matrix I2 |
| LOOP | 0 × 13 | loop the following instructions 50 times |

$$C_j = \Sigma_{i=1}^{N_{pey}} A_i \cdot B_{ij}$$

In order to derive the restriction of r and I when we should use second type of the matrix multiplication scheme, we have the following analysis. For this case, if we need to overlap the time for fetching input matrix entries with time for calculating matrix product, we should ensure the inequality as follows.

$$J > I > N_{pex} \cdot N_{pey} \tag{10}$$

For each entry, the multiply and add result should be available before the PE access the same entry to compute next slice. Therefore, we have the inequality as follows.

$$t_{mul} + t_{add} < (I)(J/N_{pex}) \tag{11}$$

$$IJ > (t_{mul} + t_{add})N_{pex}$$

Moreover, since one column of A should be able to be stored in BRAM-A, we should ensure the inequality as follows.

$$I < T,\ J < N_{pex} \cdot T \tag{12}$$

If I is too small, which satisfy the inequality as follows $$I > (t_{mul} + t_{add})/T \tag{13}$$

Then, Equation 11 and Equation 12 could not be satisfied simultaneously. In other words, I is too small to be partitioned into $N_{pey}$ parts. In this scenario, if we still use the first type scheme to compute matrix multiplication, then we can't utilize all the PEs. In ALS algorithm, matrix product like $A^TA\, X_{(1)}\cdot(C \odot B)$, TTMc 1 can be computed by this scheme.

For AB, if B is slim and tall and r is big, we have the inequality as follows alternatively, $$J > (t_{mul} + t_{add})N_{pex}/T \tag{14}$$

We can also use the similar second type matrix multiplication: scheme to compute it. In this scenario, we only need to feed BRAM-A with a row from every $B_i$ and feed BRMA-B with a column from every $A_{ij}$ Tensor Times Matrices Chain (TTMc) Operations Tensor Times Matrices Chain Operations May be Used in tensor decomposition. If a tensor $\mathcal{X}$ is multiplied by a series of matrices for distinct modes, we call this operation as Tensor times matrices chain (TTMc). Two typical TTMc are shown as TTMc1 as Equation 15 and TTMc2 as Equation 16. In general, we first do mode-1 matricization of tensor χ and multiplied it with matrix A, then we reconstruct it back to tensor $\chi' \in \mathbb{R}^{R_1 \times J \times K}$ Secondly, we continue to do mode-2 matricization of tensor χ' and multiplied it with matrix B then we reconstruct it back to tensor $\chi'' \in \mathbb{R}^{R_1 \times R_2 \times K}$. From this procedure, we can find that TTMc can be broken down as a series matrix multiplication and tensor reshape operation $$\mathcal{X} \times_{(1)} A \times_{(2)} B, \text{ where } \mathcal{X} \in \mathbb{R}^{I \times J \times K} \quad (15)$$

$$A \in \mathbb{R}^{R_1 \times I}, B \in \mathbb{R}^{R_2 \times J}$$

$$\mathcal{S} \times_{(1)} A^T \times_{(2)} B^T \times (3) C^T, \text{ where } \mathcal{S} \in \mathbb{R}^{R_1 \times R_2 \times R_3} \quad (16)$$

$$A \in \mathbb{R}^{R_1 \times I}, B \in \mathbb{R}^{R_2 \times J}, C \in \mathbb{R}^{R_3 \times K}$$

Since the tensor dimension can be large, if we simply perform the tensor times matrices chain operations one by one, we should transfer the intermediate result to main memory as RAM resources on FPGA is limited. This will increase the data traffic between FPGA and main memory, and also lead to extra power consumption. To handle this problem, we divide the large TTMc operation into a series of small TTMc operations and also design a corresponding pipeline structure to calculate the small TTMc. Indeed, for low rank tensor factorization, $R_1$, $R_2$, $R_3$ should be very small compared to the data tensor dimension I, J and K. In detail, for TTMc1, we divide $X_{(1)}$ vertically as $$[X_{(1)}^1, \ldots, X_{(1)}^K],$$

where $$X_{(1)}^k \in \mathbb{R}^{I \times J}.$$

Then, we have, the Equation below.

We can see that, the large TTMc computation have been broken up into K part of TTMc calculation as $$BX_{(1)}^{k\top} A^\top.$$

Those K part of small TTMc will be computed through the pipeline architecture which is shown in FIGS. 3A and 3B. The on-chip BRAM memory should be larger than $IR_1+IJ+JR_1+JR_2+R_1R_2$ $$\begin{aligned} \mathcal{Y} &= \mathcal{X} \times_{(1)} A \times (2) B \quad (17) \\ &= \{A[X_{(1)}^1, \ldots, X_{(1)}^K]\} \times_{(2)} B \\ &= [AX_{(1)}^1, \ldots, AX_{(1)}^K] \times_{(2)} B \\ Y_{(2)} &= [BX_{(1)}^{1\top} A^\top, \ldots, BX_{(1)}^{k\top} A^\top, \ldots, BX_{(1)}^{K\top} A^\top] \\ Y_{(2)}^k &= BX_{(1)}^{k\top} A^\top \end{aligned}$$

This type of TTMc can be partitioned into smaller TTMc computations. We partition $$X_{(1)}^k, B$$

and A following Equation 18, 20 and 19

$$X_{(1)}^k = \begin{pmatrix} X_{(1)}^{k,1,1} & \ldots & X_{(1)}^{k,\beta,1} \\ \vdots & \vdots & \vdots \\ X_{(1)}^{k,1,\alpha} & \ldots & X_{(1)}^{k,\beta,\alpha} \end{pmatrix} \quad (18)$$

$$A = [A^1 \ldots A^\alpha] \quad (19)$$

$$B = [B^1 \ldots B^\beta] \quad (20)$$

Then we substitute $$X_{(1)}^k, B$$

and A in Equation 17. We have $$Y_{(2)}^k = \sum_{j=1}^{\beta} \sum_{i=1}^{\alpha} B^j X_{(1)}^{k,j,i,\top} A^{i\top} \quad (21)$$

Figure 4:
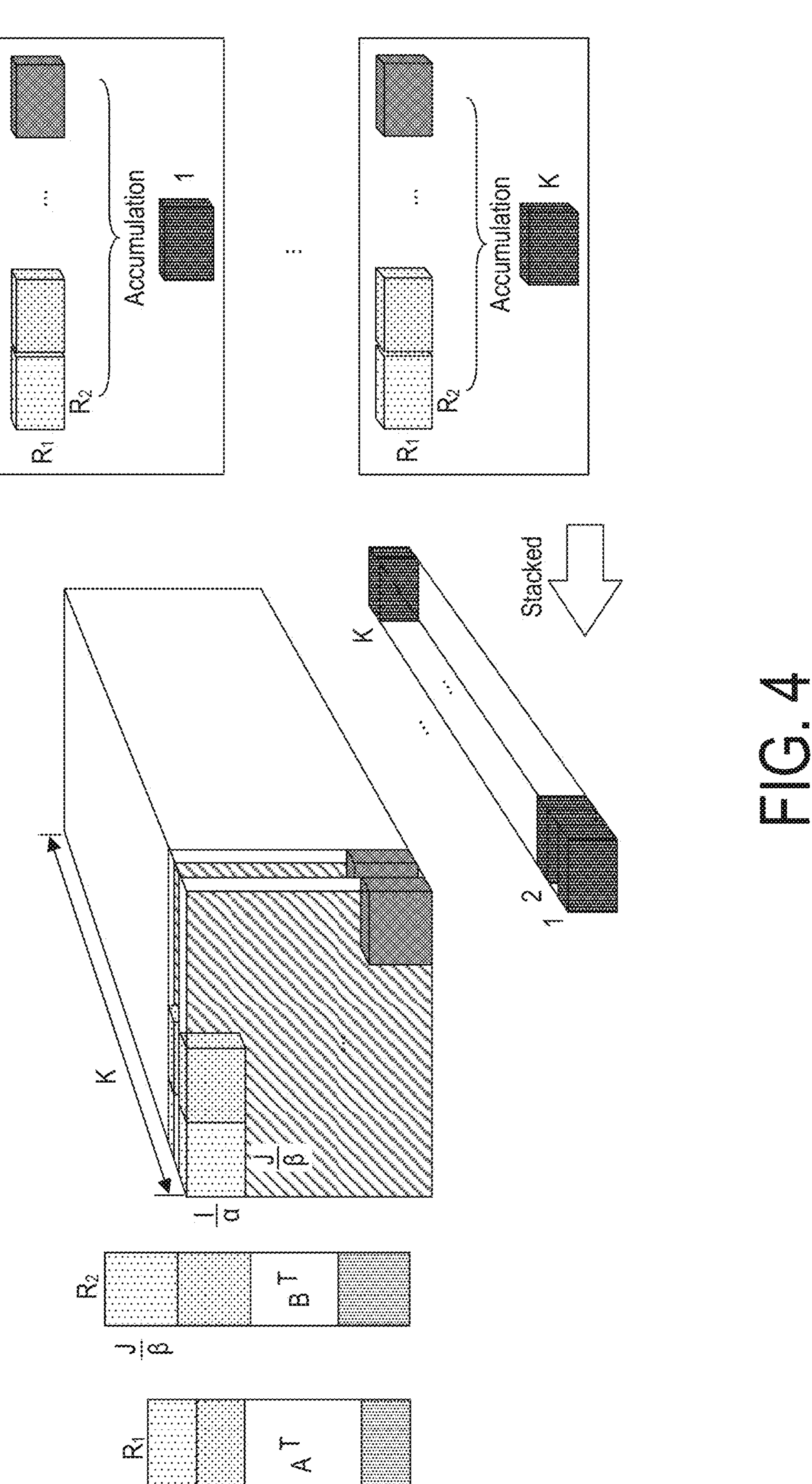
FIG. 4 is a block diagram illustrating the decomposition of a larger TTMc into small slices as we defined as a TTMc1 operation as well as the data mapping to the processing element array of FIG. 1A.
Figure 5:
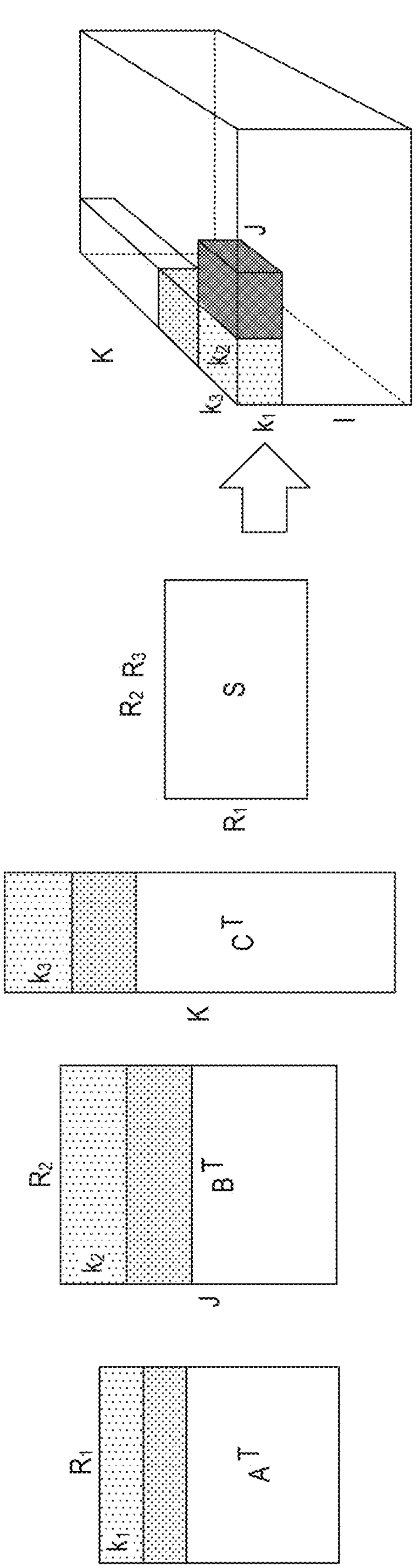
FIG. 5 is a block diagram illustrating the decomposition of a larger TTMc into small cubic as we defined as TTMc2 operation as well as the data mapping to the processing element array of FIG. 1A.

The whole process is visualized in FIG. 4 which shows the break up of a large TTMc into small trunks computation TTMc1.

$$\mathcal{Y}^j = \mathcal{X}^i \times_{(1)} A \quad (22)$$

$$\times_{(2)} B \quad (23)$$

For TTMc2, which is the data tensor reconstruction process in Tucker Decomposition, it is a process to use a small core tensor $\mathcal{S}$ and the factorized terms A, B and C to form a large tensor $\mathcal{X} \in \mathbb{R}^{IJK}$. This type of TTMc operation can be used in multi-resolution 3D volume rendering. In order to minimize the data transform from FPGA accelerator to main DDR memory, we also break the large TTMc process into small trunks. Therefore, we divide the factorized terms A, B and C vertically as $[A_1, \ldots, A_m, \ldots, A_{I/k_1}]$, $[B_1, \ldots, B_n, \ldots, B_{J/k_2}][C_1, \ldots, C_l, \ldots, C_{K/k_2}]$, which is shown as FIG. 5. Therefore, we have the equation below.

$$\mathcal{X}_{mnl} = \mathcal{S} \times_{(1)} A_m^\top \times_{(2)} B_n^\top \times_{(3)} C_l^\top \quad (24)$$

This small TTMc operation can be computed using the pipeline structure as FIGS. 3A and 3B. In this structure, we use two independent PE arrays, each of which is responsible for computing matrix multiplication. We use on-chip block RAMs to cache the intermediate result, i.e.

$$A\mathcal{X}_{(1)}^i, A_m^T S_{(1)}$$

and $B_n^T\{A_m^T S_{(1)}\}_{(2)}$.

In other words, the on-chip BRAM should be larger than $R_1R_2R_3+k_1R_1+k_1R_2+k_3R_3+k_1R_2R_3+k_1k_2R_3+k_1k_2k_3$ As a result, for TTMc1 we do not need to move all the intermediate result in Equation 21 to the off chip DDR memory, which is of the size of $KJR_1+KR_2R_1$ in total. For TTMc2 we do not need to move the intermediate results including $\mathcal{S}\times_{(1)} A^T$ and $\mathcal{S}\times_{(1)} A^T\times_{(2)} B^T$, which is of the size of $IR_2R_3$ and $IJR_3$. In other words, the data movement between FPGA and off-chip DDR memory is reduced by $2\cdot JKR_1$ or 2. $(IR_2R_3+IJR_3)$, which can improve the energy efficiency and throughput. When the dimension of tho data tensor is large, the reduction is proportional to $O(I^2)$ where I denotes the maximum size among all the dimensions

Matrized Tensor Times Khatri-Rao Product (MTTKRP)

For ALS Algorithm 1, we need to perform Khatri-Rac product between two factorized matrices. For $A\in\mathbb{R}^{I\times R}$ and $B\in\mathbb{R}^{J\times R}$, let $C=A\odot B$ and $C\in\mathbb{R}^{IJ\times R}$ which is the Khatri-Rao product of A and B. As we can see, this operation is a process to generate a tall matrix from two input. It is not resource-efficient to first compute the whole Khatri-Rao product and then store it in RAM. Especially when I and J become large, this storage is rather high. On the other hand, in ALS algorithm, Khatri-Rao product is then multiplied with flattened tensor, i.e. a matrix As a result, we try to merge the Khatri-Rao computation into matrix multiplication process.

To be specific, in Algorithm 1, since we follow type 1 partial matrix multiplication scheme, for example, to compute a slice of outer product of $X_{(1)}\cdot(C\odot B)$ we need a column of $X_{(1)}$ and $N_{pey}$ rows of $(C\odot B)$. Suppose $X_{(1)}\in\mathbb{R}^{I\times JK}$ and $\{C\odot B\}\in\mathbb{R}^{JK\times R}$ and we have k multipliers in parallel to $\mathbb{R}$ compute Khatri-Rao product. We implement a data fetch module to fetch appropriate entries of C and B and feed to the k multiplier to form required rows of Khatri-Rao product.

Then it takes $I\cdot R/(N_{peX}\cdot N_{pey})$ cycles to compute a slice of outer product and $N_{pey}\cdot R/k$ cycles to compute one row of Khatri-Rao product. In order to hide the computation time of Khatri-Rao product, we should ensure $I\cdot R/(N_{peX}\cdot N_{pey})>N_{pey}\cdot R/k$. Thus, the BRAMB will act as pipeline register to cache the required row of Khatri-Rao product.

Hadamard Product

For Hadamard product we may use single multiplier to calculate this point-wise product. We denote a run as one update for one factorized matrix. In this module, we optimize the resource usage by adding a RAM to cache intermediate result for reuse in the next run. To be specific, from Algorithm 1, for two consecutive runs, they share one common input for Hadamard product. For example, for update of A and B, they both use $C^TC$ as one input in Hadamard product computing. Thus, we can cache $C^TC$ in RAM, denoted as Hadamard RAM, to avoid repeated calculation. In detail, for the Algorithm 1, in the first tun of first iteration, since no previous result cached, we should first compute $C^TC$ and cache it in Hadamard RAM. Then we calculate $B^TB$ and hold the results in the internal RAM of PE group. After that, we feeding them to the Hadamard product module. In the second run, we only need to calculate $A^TA$ ahead of Hadamard product computation. Then in the Hadamard product calculation, we feed the entry of $A^TA$ and the entry of cached product one by one to the multiplier. At the same time, the entry of $A^TA$ cached in BRAM-C in PE group will replace the elements in the Hadamard RAM one by one. Thus, we ensure we only use one addition RAM to cache the intermediate result. In the third run, we calculate $B^TB$ and update Hadamard RAM as the process in second run. After that, in each iteration, we only calculate one matrix product, $M^TM$, and update the Hadamard RAM with it.

Matrix Inversion

In matrix inversion module, we choose to implement Gaussian-Jordan elimination with pivoting algorithm. This algorithm is easy to implement in hardware, but in this embodiment of the tensor processor 100, we may be able to minimize the resource usage by time-sharing resources with previous module. For Gaussian-Jordan elimination with pivoting, it has 3 major stages. The first one is called partial pivoting to find out the max value as pivot. Then Gaussian Jordan elimination and substitution is performed. Finally, the result matrix is normalized for output.

For partial pivoting, we use a comparator to find out the max value. Both pivot and its position would be cached. In order to save energy and improve performance, we do not swap the rows explicitly. Instead, we maintain a row map vector, to save the mapping of logical row position and physical row position. If we need to swap two rows, we only need to modify the corresponding value of the vector. Suppose we need to inverse matrix $A\in\mathbb{R}^{n\times n}$ For partial pivoting, pivot should be chosen from $A_{ii}$ to $A_{in}$. Since we use a vector to indicate the actual location of rows of A, we need to first get the physical row position from the table, and then fetch the corresponding entries.

For the latter two steps, we merge them into one step, and rearrange the computation to better reuse the PE array.

Normally, we do the forward elimination first and then the backward substitution. However, the order of these two processes is irrelevant. For the i-th Gaussian-Jordan elimination process, they can be represented as a unified Equation 25 While for $A_{ii}$, i.e. the pivot, will remain unchanged during the i-th Gaussian-Jordan elimination. As we can observe from Equation 25, it is suitable to use the PE array in FIGS. 3A and 3B to compute and no need to change the control logic. We denote $r\in\mathbb{R}^n$ as the ratio vector, $p\in\mathbb{R}^n$ as the pivot row, anc $C\in\mathbb{R}^{n\times n}$ as a modified $\mathbb{R}$ copy of matrix A, while the detail definition is shown in Equations 27 and 28. Then we car combine the Gaussian-Jordan elimination and normalization into a single process, which is shown in Equation 30. We can. verify that, following Equation 30, for $C_{k_m}$, where m, k≠i the entries are equal to the result in Equation 25.

Originally each time we do the Gaussian-Jordan elimination, the i-th column except $[A|I]_{ii}$ will be eliminated, and the (n+i) th column will be changed from $e_i$ to $$-\frac{A_{k,i}}{\text{pivot }(i)},$$

where k≠i To save memory, we save these new entries in the space of the i-th column, and there is no need to augment the matrix. In order to recover the real inverse matrix, we use a column map vector to record the mapping relationship. For other entries according to Equations 27, 28 and 30, we have the result $$C_{ii} = \frac{1}{\text{pivot }(i)} \text{ and}$$

$$C_{ik} = \frac{A_{i,k}}{\text{pivot }(i)},$$

which is equivalent to the normalization pivot (i) process. It is easy to verify that our computation reorganization is equivalent to the original algorithm. To use the PE array in FIGS. 3A and 3B, we just need to feed r to BRAM-A, p to BRAM-B, and C to BRAM-C. Then the PE array will compute the result following Equation 29 and save it into BRAM-C. After the whole iteration completed, we can obtain the result from the BRAM-C. Since we do not augment matrix A and do not swap rows explicitly, the entries in BRAM-C should be mapped through row map vector and column map vector to recover the real inverse matrix.

$$A_{k,m} = A_{k,m} - \frac{A_{k,i}}{\text{pivot }(i)} \cdot A_{i,m} \tag{25}$$

where $m, k \in [1, i) \cup (i, n]$ $$A_k = \frac{A_k}{\text{pivot }(k)} \tag{26}$$

$$r_k = \begin{cases} -\frac{A_{k,i}}{\text{pivot }(i)} & k \in [1, i) \cup (i, n] \\ \frac{1}{\text{pivot }(i)} & -1\ k = i \end{cases} \tag{27}$$

$$p_m = A_{i,m} \tag{28}$$

$$C = C + r \cdot p^T \tag{29}$$

Norm Calculation and Normalization

Since the norm calculation and normalization process is the last step of each iteration, in our design, we reuse the PE array to implement this module. In practical, we often need to calculate the first norm and second norm of the factorized matrix. Thus, in our design, these two typical norm calculations are implemented. In the norm calculation phase, and the routing of one column of the PE array is changed to compute maximum norm or Euclidean norm. The architecture is shown in FIGS. 3A and 3B. For the maximum norm, we need to find out the maximum value. As a result, to save resources, we reuse 8 multiplexers which are used in double buffering of partial product to select the larger one through the subtract result and reuse the BRAM in PE to cache the data. For the Euclidean norm, we only change the routing for one column of PE to build up the tree as FIGS. 3A and 3B).

From the hardware architecture as FIGS. 3A and 3B, the last addition or subtraction would use previous results. Since we need several cycles for the addition, if we directly use the hardware in FIGS. 3A and 3B, we should always wait multiple cycles until the previous addition result available. To avoid performance loss, we use the technique called adder time-sharing. If we should calculate n norms, data included in different norm calculation are interleaved to time-share the adders and cache intermediate results which are not used immediately.

To hide the computation delay of the adder, which is t cycles, we should ensure n>t. If n=1, we should first divide the data into n' partitions and ensure n'>t. Then, data from different partitions are interleaved to time-share the adders. In the last stage, we should reduce the n' results to 1 by either accumulation for Euclidean norm or choosing the largest for the maximum norm. If 1<n≤t, we first divide the data belong to the first norm calculation into n' partitions and then apply the method we used in the case of n=1 to get the first norm. Then, we loop this process to calculate remaining norms. After we get the norms, we can perform normalization by using these norms.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilised. This will include stand alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A tensor processor comprising:

a central control module configured to decode a received tensor operation instruction;

a processing element controller;

a plurality of tensor manipulation modules configured to selectively instruct the processing element controller based on the received tensor operation instruction;

a plurality of processing elements arranged in a plurality of processing columns;

wherein each of the plurality of processing elements comprises a first local block memory (BRAM-A) for storing a first input matrix, a second local block memory (BRAM-B) for storing a second input matrix, a third local block memory (BRAM-C) for storing an output result matrix; and multiple multiplexers coupled to the plurality of processing elements and controlled by the processing element controller, wherein the BRAM-A, BRAM-B, and BRAM-C are adapted to perform double buffering of the first input matrix, the second input matrix and the output result matrix by:

alternately using one of the BRAM-A and the BRAM-B for receiving new input data, wherein, when the BRAM-A is used for receiving new input data, the BRAM-B is providing data for computation, and, when the BRAM-B is used for receiving new input data, the BRAM-A is providing data for computation, and alternately using portions of the BRAM-C for storing new results while other portions of the BRAM-C are being read out, wherein each of the plurality of tensor manipulation modules is adapted to instruct the processing element controller to perform a plurality of tensor operations, wherein the processing element controller is adapted to signal the multiple multiplexers to selectively configure the plurality of processing elements to function as two cascaded two-dimensional matrix multiplication arrays, wherein, for performing a selected one of the plurality of tensor operations corresponding to the received tensor operation instruction, the processing element controller is arranged to configure, in real time, the plurality of processing elements located within a single processing column of the plurality of processing columns to selectively form one of a plurality of computational structures to perform the selected one of the plurality of tensor operations;

wherein the selected one of the plurality of tensor operations is performed by the one of a plurality of computational structures such that all intermediate computational results generated and consumed solely within the single processing column during the performance of the selected tensor operation are stored and processed using local block memory without transferring data to off-chip memory during the performing of the selected one of the plurality of tensor operations, wherein the plurality of computational structures comprises an adder-tree and a multiplier adder tree, and wherein the plurality of tensor operations comprises Khatri-Rao product operation, Hadamard product operation, Tensor times matrix and matrix multiplication operation Matrix inversion operation, maximum normal of each column of a matrix or Euclidean normal of each column of a matrix, and Tensor times matrices chain (TTMc) operations.

2. The tensor processor in accordance with claim 1, wherein the processing element controller is adapted to signal the multiple multiplexers to selectively configure each of the two cascaded two-dimensional matrix multiplication arrays to comprise different numbers of the plurality of processing elements.

3. The tensor processor in accordance with claim 2, the plurality of tensor manipulation modules is adapted to perform two types of tensor times matrix chain (TTMc1 and TTMc2) operations, wherein for TTMc1 operation, a first matrix multiplication array is adapted to compute $$I = X_{(1)}{}^{kT} A^T,$$

and store an intermediate output in the local block memory, and then a second matrix multiplication array is adapted to compute B·I; and wherein for the TTMc2 operation, the first matrix multiplication array is adapted to compute $$I_1 = A_m{}^T S_{(1)} \text{ and } I_2 = B_n{}^T I_{1(2)}$$

and the second matrix multiplication array is adapted to compute $$T = C_l^T I_{2(3)}.$$

4. The tensor processor in accordance with claim 3, wherein each of the plurality of processing elements has a local block memory size (T) for input data dependent on one or more factors comprising output matrix size (I, J), size of a matrix multiplication array ($N_{pex}$, $N_{pey}$), and clock cycles of computation delay of a multiplier and an adder of a processing element ($T_{mul}$, $T_{add}$).

5. The tensor processor in accordance with claim 1, wherein the tensor operations are performed on a plurality of decomposition components.

6. A tensor processor in accordance with claim 1, wherein the plurality of tensor manipulation modules includes:

a Khatri-Rao module arranged to configure the plurality of processing elements with the multiplexers to perform matricized tensor times Khatri-Rao product operations;

a Hadamard module arranged to configure the plurality of processing elements with the multiplexers to perform Hadamard product operations;

a multiplication module arranged to configure the plurality of processing elements with the multiplexers to perform Tensor times matrix and matrix multiplication operation;

an inversion module arranged to configure the plurality of processing elements with the multiplexers to perform Matrix inversion operations;

a Normal (norm) module arranged to configure the plurality of processing elements with the multiplexers to perform maximum normal of each column of a matrix or Euclidean normal of each column of a matrix; and a Tensor times matrices chain (TTMc) module arranged to configure the plurality of processing elements with the multiplexers to perform TTMc operations.

7. The tensor processor in accordance with claim 1, wherein the tensor processor is implemented by programming a Field Programmable Gate Array module.

8. A method for processing a tensor having a central control module, a processing element controller, a plurality of tensor manipulation modules, a plurality of processing elements, and multiple multiplexers, wherein the method comprises:

decoding, by the central control module, a received tensor operation instruction;

based on the decoded instruction, selectively instructing the processing element controller by one of the plurality of tensor manipulation modules to perform a plurality of tensor operations;

signaling the multiple multiplexers by the processing element controller to configure each of the plurality of processing elements to be arranged in a plurality of processing columns, wherein each processing element comprises local block memory including at least a first input block memory (BRAM-A), a second input block memory (BRAM-B), and an output block memory (BRAM-C), and wherein the multiple multiplexers are coupled to the plurality of processing elements and controlled by the processing element controller;

arranging an adder, a multiplier, the first input block memory (BRAM-A) for storing a first input matrix, the second input block memory (BRAM-B) for storing a second input matrix, and the third input block memory (BRAM-C) for storing an output result matrix;

coordinating, by the processing element controller, data transfers involving the first input block memory (BRAM-A), the second input block memory (BRAM-B), and the output block memory (BRAM-C) associated with the plurality of processing elements to perform double buffering of the first input matrix, the second input matrix and the output result matrix by alternately using one of the BRAM-A and the BRAM-B for receiving new input data, wherein, when the BRAM-A is used for receiving new input data, the BRAM-B is providing data for computation, and, when the BRAM-B is used for receiving new input data, the BRAM-A is providing data for computation, and alternately using portions of the BRAM-C for storing new results while other portions of the BRAM-C are being read out, wherein the plurality of processing elements function as two cascaded two-dimensional matrix multiplication arrays, and each of the plurality of processing elements has a local block memory size (T) for input data dependent on one or more factors comprising output matrix size (I, J), size of a matrix multiplication arrays ($N_{pex}$, $N_{pey}$), and clock cycles of computation delay of a multiplier and an adder of a processing element ($T_{mul}$, $T_{add}$), wherein, for performing a selected one of the plurality of tensor operations corresponding to the received tensor operation instruction, the processing element controller is arranged to configure, in real time, the plurality of processing elements located within a single processing column of the plurality of processing columns to selectively form one of a plurality of computational structures to perform the selected one of the plurality of tensor operations;

wherein the selected one of the plurality of tensor operations is performed by the one of a plurality of computational structures such that all intermediate computational results generated and consumed solely within the single processing column during the performance of the selected tensor operation are stored and processed using local block memory without transferring data to off-chip memory during the performing of the selected one of the plurality of tensor operations, wherein the plurality of computational structures comprises an adder-tree, and a multiplier adder tree, and wherein the plurality of tensor operations comprises Khatri-Rao product operation, Hadamard product operation, Tensor times matrix and matrix multiplication operation, Matrix inversion operation, maximum normal of each columns of a matrix or Euclidean normal of each column of a matrix, and Tensor times matrices chain (TTMc) operations.

9. The method for processing a tensor in accordance with claim 8, wherein the processing element controller is adapted to signal the multiple multiplexers to selectively configure each of the matrix multiplication arrays to comprise different numbers of the plurality of processing elements.

10. The method for processing a tensor in accordance with claim 9, wherein the plurality of processing elements is operated by the processing element controller as parallel matrix multiplication arrays, each arranged to perform tensor operations on divided components of a tensor.

11. The method for processing a tensor in accordance with claim 10, wherein when the selected one of a plurality of tensor operations for a component of the tensor is completed, a component result is generated.

12. A method for processing a tensor in accordance with claim 11, wherein the generated component results are accumulated to determine a result of the tensor operation for the tensor.

13. A method for processing a tensor in accordance with claim 12, wherein the tensor comprises a plurality of decomposition components.

* * * * *